United States Patent [19]
Cheng et al.

[11] Patent Number: 6,145,815
[45] Date of Patent: Nov. 14, 2000

[54] SYSTEM FOR ENHANCED GAS DISSOLUTION HAVING A HOOD POSITIONED OVER THE IMPELLER WITH SEGREGATING RINGS

[75] Inventors: Alan Tat Yan Cheng, Livingston, N.J.; Steven Donald Clark, Grand Island, N.Y.; Paolo Sergio Bon, Sao Paulo, Brazil; Thomas John Bergman, Jr., Clarence Center; Jeffrey Paul Kingsley, Newburgh, both of N.Y.; Mark Herbert Kirby, Burlington, Canada; Mitchell Adis, North White Plains, N.Y.; Victor Alexander Coppola, Norwalk, Conn.

[73] Assignee: Praxair Technology, Inc., Danbury, Conn.

[21] Appl. No.: 09/203,050

[22] Filed: Dec. 2, 1998

Related U.S. Application Data

[63] Continuation-in-part of application No. 09/065,439, Apr. 24, 1998, which is a continuation of application No. 07/927,711, Aug. 17, 1992, abandoned.

[51] Int. Cl.$^7$ ........................................................ B01F 3/04
[52] U.S. Cl. .......................... 261/93; 261/120; 261/121.1
[58] Field of Search ............................... 261/91, 93, 120, 261/121.1, 123

[56] References Cited

U.S. PATENT DOCUMENTS

| | | | |
|---|---|---|---|
| Re. 32,562 | 12/1987 | Litz ............................................. | 261/91 |
| 2,313,654 | 3/1943 | MacLean ..................................... | 261/93 |
| 3,189,334 | 6/1965 | Bell ............................................. | 261/93 |
| 3,547,811 | 12/1970 | McWhirter ................................. | 261/93 |
| 3,775,307 | 11/1973 | McWhirter et al. ....................... | 210/14 |
| 3,846,516 | 11/1974 | Carlson ...................................... | 261/87 |
| 3,925,522 | 12/1975 | Schreiber ................................... | 261/92 |
| 4,290,885 | 9/1981 | Kwak ......................................... | 261/93 |
| 4,468,358 | 8/1984 | Haegeman ................................. | 261/91 |
| 4,681,711 | 7/1987 | Eaton ......................................... | 261/91 |
| 4,735,750 | 4/1988 | Damann ..................................... | 261/29 |
| 4,844,802 | 7/1989 | Hove .......................................... | 261/91 |
| 4,900,480 | 2/1990 | Litz et al. ............................... | 261/36.1 |
| 4,902,302 | 2/1990 | Reid ........................................ | 210/628 |

FOREIGN PATENT DOCUMENTS

| | | | |
|---|---|---|---|
| 2123732 | 9/1972 | France .................................... | 261/124 |
| 2734629 | 2/1979 | Germany ................................. | 261/120 |
| 1547115 | 6/1979 | United Kingdom .................... | 261/91 |

*Primary Examiner*—David A. Simmons
*Assistant Examiner*—Robert A. Hopkins
*Attorney, Agent, or Firm*—Bernard Lau

[57] ABSTRACT

A system for the dissolution of gas in a large body of liquid comprising an impeller positioned below the surface of the large body of liquid; a floating hood positioned over the impeller and of sufficient size to capture undissolved gas; a conduit for introducing a feed gas stream beneath the floating hood and directly into the large body of liquid; at least one segregation ring positioned under the floating hood and extending below the surface of the large body of liquid such that a first inner region between the ring and the impeller, and a second outer region between the ring and an outer diameter of the floating hood are created, and a back pressure regulator located in the floating hood adjacent to the outer diameter of the floating hood.

17 Claims, 4 Drawing Sheets

SYSTEM FOR ENHANCED GAS DISSOLUTION HAVING A HOOD POSITIONED OVER THE IMPELLER WITH SEGREGATING RINGS

This application is a continuation in part of Ser. No 09/065,439 filed Apr. 24, 1998, which is a continuation of Ser. No. 07/927,711 filed Aug. 17, 1992, abandoned.

BACKGROUND OF THE INVENTION

1. Field of the Invention

This invention relates to the dissolution of gases in liquids. More particularly, it relates to the oxygenation of large bodies of water.

2. Description of the Prior Art

Liquid waste destruction is commonly achieved at low cost by slurry-phase biotreatment processes in lagoons, surface impoundments and large tanks. In such processes, biological organisms, which may be either indigenous to the waste body or seeded therein from an external source, consume toxic, organic contaminants present in the waste body and convert them to less harmful substances.

For such biotreatment purposes, aerobic organisms are most commonly employed because, in general, they destroy organic contaminants much faster than anaerobic organisms. It will be appreciated that oxygen must be supplied to such processes in order to maintain a high contaminant destruction rate.

Surface aeration is a common oxygen supply method that can be used in slurry phase biotreatment operations. Such surface aeration is disclosed in the Haegeman patent, U.S. Pat. No. 4,468,358. In this approach, water is pumped from a waste body into the air for the entrainment and dissolution of oxygen therein. An effective oxygen transfer efficiency of approximately 1.9–2.6 lb/hp-hr can be achieved thereby. Surface aeration methods can cause severe foaming and, because they promote intimate contact between the waste material and the surrounding air, result in very high, undesirable organic chemical air emissions.

Air sparging is another common method for supplying oxygen to waste bodies for such biotreatment purposes. However, conventional air spargers typically result in the dissolution of only 5–10% of the oxygen injected into waste bodies thereby. Thus, for example, approximately 50–100 scfm of air must be injected into the waste bodies in order to dissolve 1 scfm oxygen. In addition, air sparging can cause unacceptable levels of organic chemical emissions as a result of the stripping action of waste oxygen and nitrogen on volatile compounds, when present in the waste bodies being treated. Severe foaming can also occur during air sparing operations.

If air is replaced by pure oxygen for biotreatment purposes, a much smaller feed gas volume is required to achieve the same dissolved oxygen level achieved by air sparging, and greatly reduced air emission levels result. However, most of the injected pure oxygen must be dissolved for such processing to be economical. In addition, the composition of any off gas must be outside the flammability limits of organic chemicals contained in the lagoon or other body of waste liquid.

Slurry phase biotreatment has been practiced, in a so-called MIXFLO™ approach, by pumping a side stream slurry from a tank or lagoon and injecting pure oxygen therein. The resulting two phase mixture is then passed through a pipeline contactor where approximately 60% of the injected oxygen dissolves. The thus-oxygenated slurry and the remaining undissolved oxygen are then re-injected into the tank or lagoon by passage through liquid/liquid eductors. About 75% of the undissolved oxygen remaining at the eductor inlet is thereby dissolved, resulting in the overall dissolution of 90% of the injected oxygen. The pumping power required for this application is relatively high, i.e., having an effective oxygen transfer efficiency of about 2 lb/hp-hr.

The UNOX® Process is a surface aeration process using a pure oxygen-containing headspace. An effective oxygen transfer efficiency of 6.5–7.2 lb/hp-hr can be achieved using this process and system. This approach can cause severe foaming, and waste liquid must be pumped from a large tank or lagoon to an external tank reactor, treated therein, and returned to said large tank or lagoon. It is thus subject to appreciable pumping costs.

Two other approaches that likewise are carried out in covered, confined tank systems, are the Advanced Gas Reactor (AGR) and Liquid Organic Reactor (LOR) processes and systems of Praxair, Inc. The AGR process and system, covered by the Litz patent, U.S. Re. 32,562, uses a helical screw impeller/draft tube assembly in a reactor to enhance the dissolution of oxygen from an overhead gas space. As the impeller turns, slurry is pumped through the draft tube so as to create, together with baffles positioned at the top of the draft tube, vortices in the pumped liquid, resulting in the entrainment of gas from the reactor headspace. Any gas not dissolved in a single pass through the draft tube is recirculated to the headspace and recycled. The AGR approach has an effective transfer efficiency of approximately 10 lb/hp-hr (standard transfer efficiency of 17–18 lb/hp-hr), and results in the dissolution of nearly 100% of the oxygen introduced into the system. It also ingests and destroys foam upon its passage through the draft tube.

The LOR process and system, covered by the Litz et al. patent, U.S. Pat. No. 4,900,480, is designed to safely dissolve oxygen in organic chemical-containing liquids. In certain embodiments, a horizontal baffle is positioned above the impeller/draft tube so as to provide a quiescent zone of liquid above the zone intended for gas-liquid mixing. Oxygen is injected directly into the impeller zone at a rate sufficient to sustain a high reaction rate, but low enough to maintain the oxygen level below the flammability limits of organic reactor contents. The LOR approach, like the AGR, consumes less power per pound of oxygen dissolved than pumping systems, the effective transfer efficiency of the LOR being approximately 10 lb/hp-hr.

Both the AGR and LOR approaches are carried out in covered, confined tank systems. Because of the tank requirements thereof and because of the additional foaming problems associated with the UNOX approach referred to above, further improvements in oxygen dissolution are desired in the art. Such improvements, in particular, are desired in light of the high power requirements associated with MIXFLO.

It is an object of the invention, therefore, to provide an improved approach to the dissolution of oxygen in liquids.

It is another object of the invention to provide a system for the efficient dissolution of oxygen in large liquid bodies.

With these and other objects in mind, the invention is hereinafter described in detail, the novel features thereof being particularly pointed out in the appended claims.

SUMMARY OF THE INVENTION

An impeller or impeller/draft tube assembly is covered by an air/recirculating gas separation baffle or floating hood means, and supported or floated in a large liquid body. Gas, such as oxygen or carbon dioxide, is injected under the baffle or floating hood and is ingested into the suction of the impeller. The system is employed without a confining outer tank for the liquid. Liquid rich in dissolved gas and any undissolved gas are discharged from the bottom of the draft tube. The undissolved gas floats toward the surface and is recovered by said baffle or floating hood means for recirculation to the impeller or impeller/draft tube assembly. The liquid with dissolved gas distributes into the large liquid body.

BRIEF DESCRIPTION OF THE DRAWING

The invention is hereinafter described with reference to the accompanying drawings in which.

DETAILED DESCRIPTION OF THE INVENTION

The objects of the invention are accomplished by employing an efficient oxygenation system positioned in a lagoon or other large body of liquid. The system comprises downward pumping impeller means or an impeller/draft tube assembly positioned in said body of liquid, without a confining outer tank, and covered by an air/recirculating gas separation baffle or floating hood. The floating hood can maintain its relative position in said body of liquid because it is supported by an attached floating device that is lighter than water. In the alternative it can be self-supporting due to its hollow structure and/or its construction of light weight material. Gas, such as oxygen, is injected into the body of liquid, as in the AGR or LOR approaches, with said gas being injected under the baffle or floating hood adapted to trap escaping undissolved gas. The gas is ingested, by the downward pumping impeller suction, into the downwardly passing liquid stream in the draft tube, for enhanced dissolution therein. The thus gasified liquid, and any undissolved gas, are discharged from the bottom of the draft tube. While reference is made below to oxygen for convenience in describing the invention, it will be understood that oxygen is an illustrative example of the gases that can be dissolved in a large body of liquid in the practice of the invention.

Figure 1:
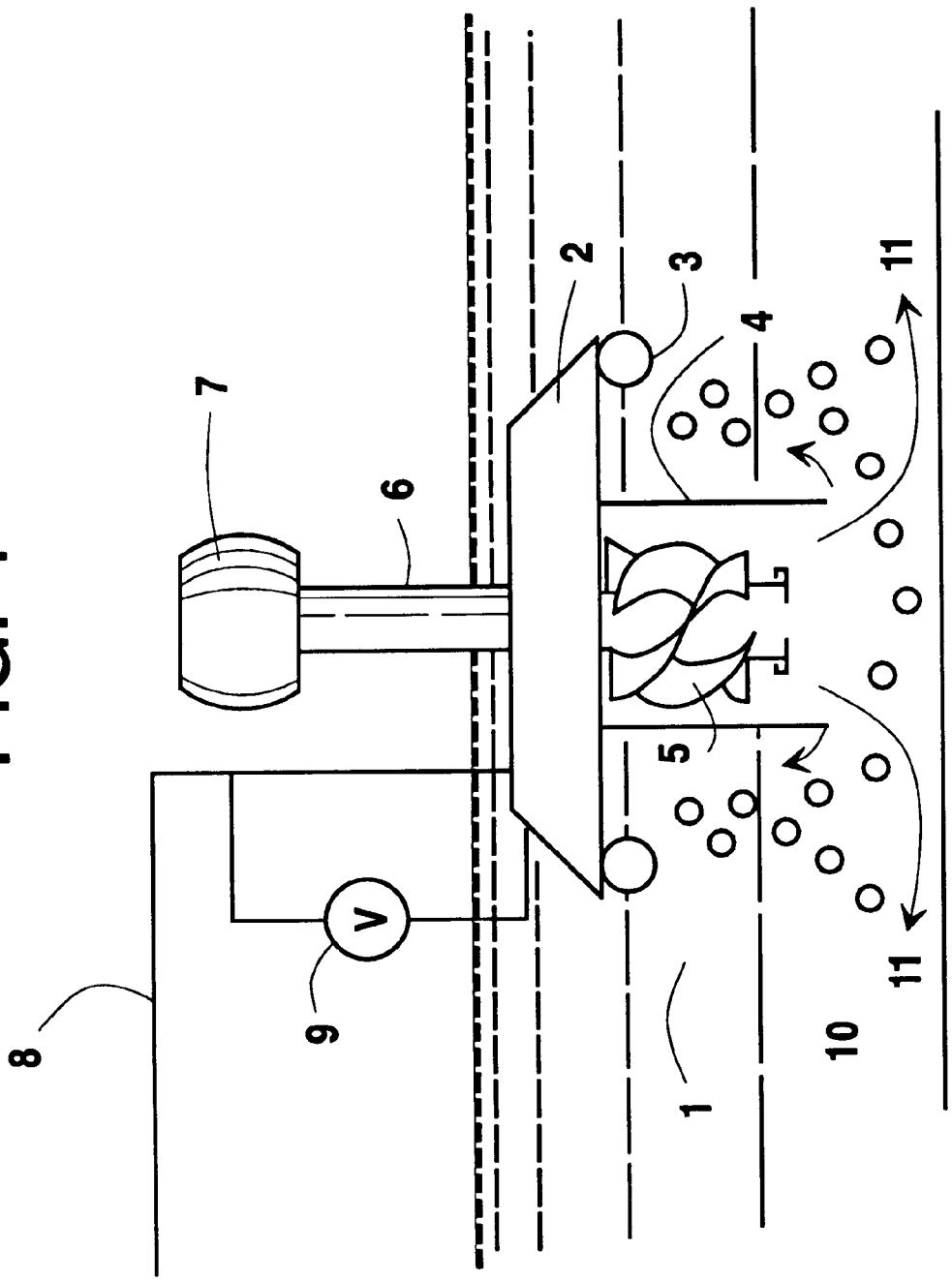
FIG. 1 is a schematic flow diagram of an embodiment of the invention, positioned in a lagoon or other large body of liquid.

In one embodiment of the invention shown in FIG. 1 of the drawings, a large body of liquid, e.g., a lake, surface impoundment, tank, pond, lagoon or the like, is represented by the numeral 1 in which baffle means 2, conveniently horizontally positioned and commonly somewhat conical in shape, is positioned, as by floats 3. Hollow draft tube 4 is positioned under said baffle means 2 and has impeller means 5 located therein. Said impeller means 5 is driven by drive shaft 6 that extends upward above the water level of said body of liquid 1 and is driven by drive motor 7. Oxygen is injected into the body of liquid through line 8 adapted to inject the oxygen preferably under, or in the proximity of, baffle means 2 so as to be ingested into the suction of impeller means 5. Indeed, it may be preferred to inject the gas directly into the vortex created by the impeller, for reasons that will be discussed below. Pressure tap 9 is provided so that the liquid level under baffle means 2 can be determined.

Oxygenated liquid and any undissolved oxygen are discharged from the bottom of draft tube 4. Oxygenated liquid passing from the draft is not recycled to the upper part of the draft tube for passage through impeller means 5, as in AGR and LOR systems, because of the absence of a confining outer tank in operation within a lagoon or other body of liquid 1. In such large liquid body applications, it is undesirable for the discharged liquid to recirculate to the impeller suction. If liquid discharging from the bottom of the draft tube were to recycle to the suction at the upper end of the draft tube, the dissolved oxygen would not readily disperse outward into the bulk liquid in the lagoon. Consequently, liquid in the impeller's zone of influence would have a very high dissolved oxygen level, and liquid away from this zone would be oxygen starved. For all embodiments of this invention, it is most desirable to contact the pure oxygen directly with the oxygen depleted liquid in order to obtain maximum oxygen transfer rate.

Any oxygen not dissolved in the liquid upon passing through the impeller zone in the draft tube rises close to the draft tube wall, e.g., in flow pattern 10, due to its buoyancy, is captured by conical-horizontal baffle means 2, and is channeled back into impeller means 5 within draft tube 4. The conical baffle is desirably adapted and is sufficiently wide to capture most of the undissolved oxygen, resulting in essentially 100% oxygen utilization in the practice of the invention. The oxygenated liquid discharged from the bottom of draft tube 4 flows outward into the body of liquid in flow pattern 11 so that the dissolved oxygen is readily dispersed throughout the body of liquid 1.

Figure 2:
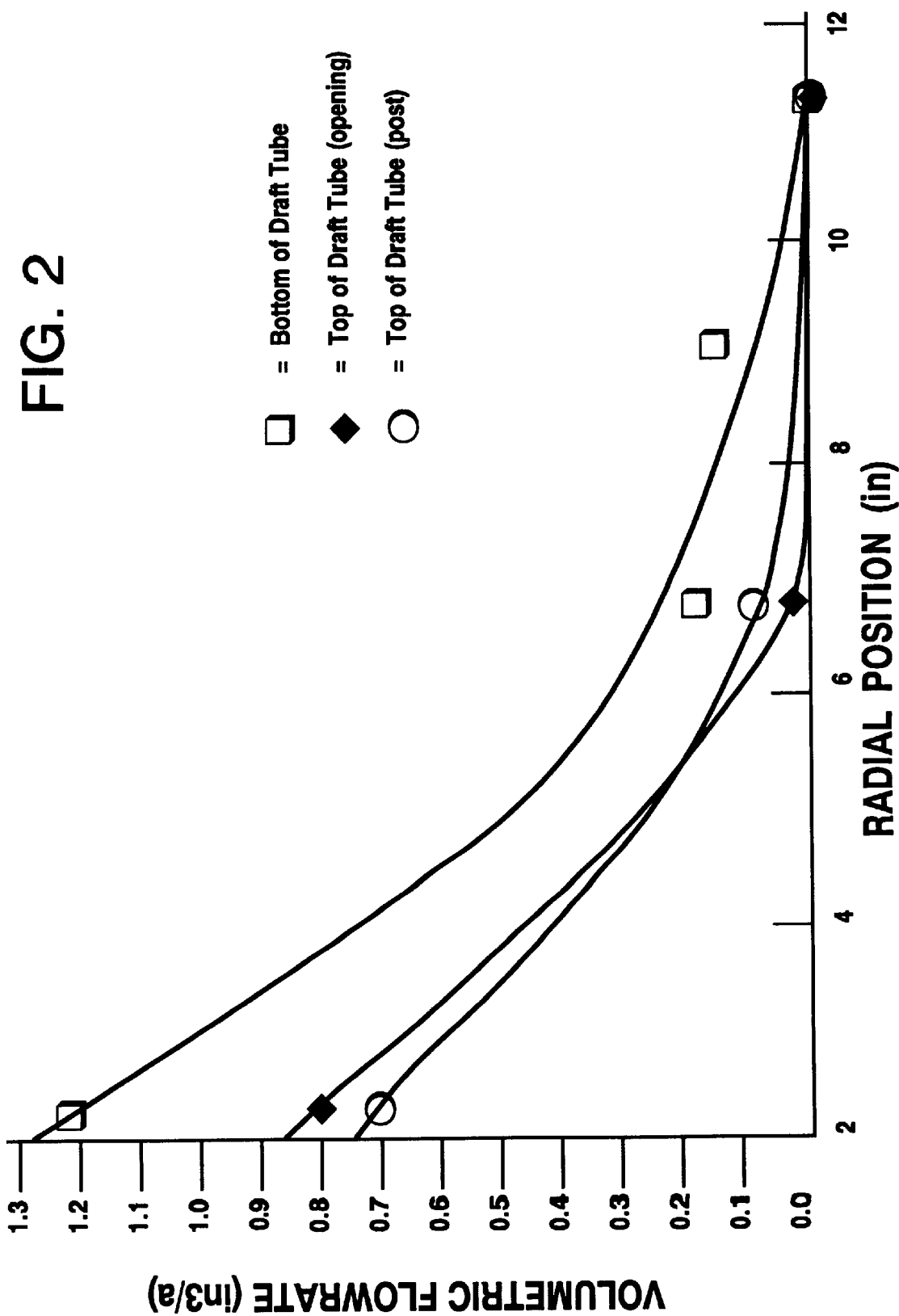
FIG. 2 is a plot of the radial gas distribution profiles at the top and bottom of a particular draft tube embodiment of the invention.

Radial gas distribution profiles were measured for a 3" diameter impeller means positioned in a hollow draft tube in embodiments of the invention. The results were as shown in FIG. 2 of the drawing in which the volumetric gas flow rate was plotted against radial position at the bottom of the draft tube, the top of the draft tube at the opening thereof and at the post opening thereof. The results demonstrated that the conical baffle size required to capture essentially 100% of the undissolved oxygen is relatively small. This is because of the absence of a reactor tank floor which, if present, would tend to enhance the radial dispersion of undissolved oxygen striking the tank floor. If a 24" diameter impeller were employed in an oxygenator operating, in the practice of the invention, at 290 RPM, a 72" diameter baffle would be sufficient to capture essentially all of the undissolved oxygen rising in flow pattern 10 close to the outside of draft tube 4, consistent with the FIG. 2 results showing that most of the undissolved oxygen exists at a short radial distance from the draft tube.

The standard oxygen transfer efficiency of the in-situ oxygenator of the invention was found to be 19.5 lb/hp-hr, which is equivalent to the standard efficiency of an AGR system and much higher than the transfer efficiency associated with sidestream pumping and surface aeration operations.

Figure 3:
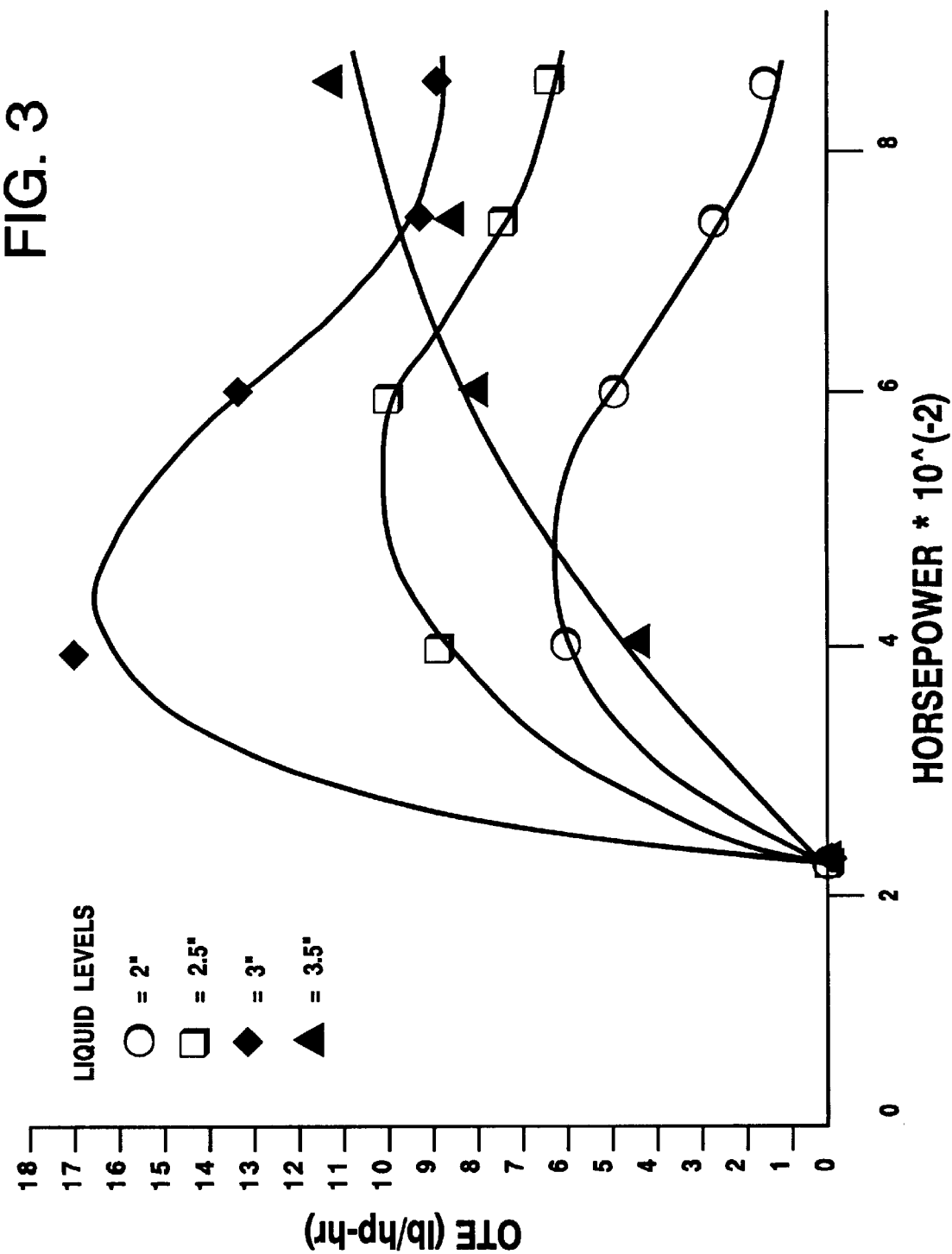
FIG. 3 is a plot showing the oxygen transfer efficiency per unit horsepower at various liquid levels in the in-situ oxygenator system of the invention.

It should be noted that the maintenance of a constant inside liquid level under the conical baffle or floating hood can strongly impact the volume of oxygen dissolved per unit horsepower. Thus is indicated by the plot, in FIG. 3 of the drawing, of the oxygen transfer efficiency verses horsepower input at various liquid levels inside conical baffle embodiment of FIG. 1.

It is desirable, in the practice of the invention, to have the inside liquid level monitored and maintained at a height relative to the inlet of the hollow draft tube. Since the outside liquid level in a biological water treatment pond or tank can change drastically, the liquid level inside the baffle or hood will be also change unless the whole assembly including the baffle or hood, draft tube and impeller are suspended in the body of liquid 1 with a float.

Once the whole assembly is suspended in the body of liquid 1 at a certain position, the liquid level inside the baffle or hood can be changed to its optimum height by regulation of the pressure under the conical baffle or hood. As the amount of gas under the baffle or hood increases, the pressure under the baffle or hood increases. The liquid level may be controlled, therefore, by increasing the oxygen injection rate if the pressure under the baffle or floating hood falls below a predetermined set point, and by decreasing the oxygen injection rate if the pressure under the baffle or hood exceeds the set point. Unfortunately, as the purity of the injected oxygen decreases, the less accurate this method of controlling liquid level becomes. In particular, with a lower purity gas, the gas pressure under the baffle or hood may be inflated due to the presence of other gases (e.g. nitrogen) under the baffle or hood. Thus, when lower purity gas (e.g. oxygen) is used, an alternative system is required, as will be discussed below with reference to FIG. 4.

The oxygenation of the invention may also be used to control solids suspension in the liquid. The velocity and axial gas distribution characteristics of the oxygenator can be used to predict the solids suspension level achievable, or to avoid solids suspension altogether. This is a highly desirable aspect of the practice of the invention because, in biotreatment, too high a solids suspension level is a waste of electrical power and sometimes can poison the bacteria that consume organic contaminants in the body of liquid being treated. Too low a solids suspension results in insufficient distribution of nutrients to the biomass for waste destruction. Since the invention employs an impeller positioned in a draft tube, as in the AGR and LOR approaches, it is a foam consumer, thus eliminating the foaming concerns associated with the surface aeration approach. In addition, since organic chemicals are not sprayed into a gaseous headspace, organic stripping is minimal.

Those skilled in the art will appreciate that the invention can be used for the dissolution of from gases containing 21% oxygen (i.e. air), and up to 100% oxygen. For gases containing any excess inert gases, such as nitrogen, which is present in the lower purity gases, a preferred embodiment is disclosed in FIG. 4.

Figure 4:
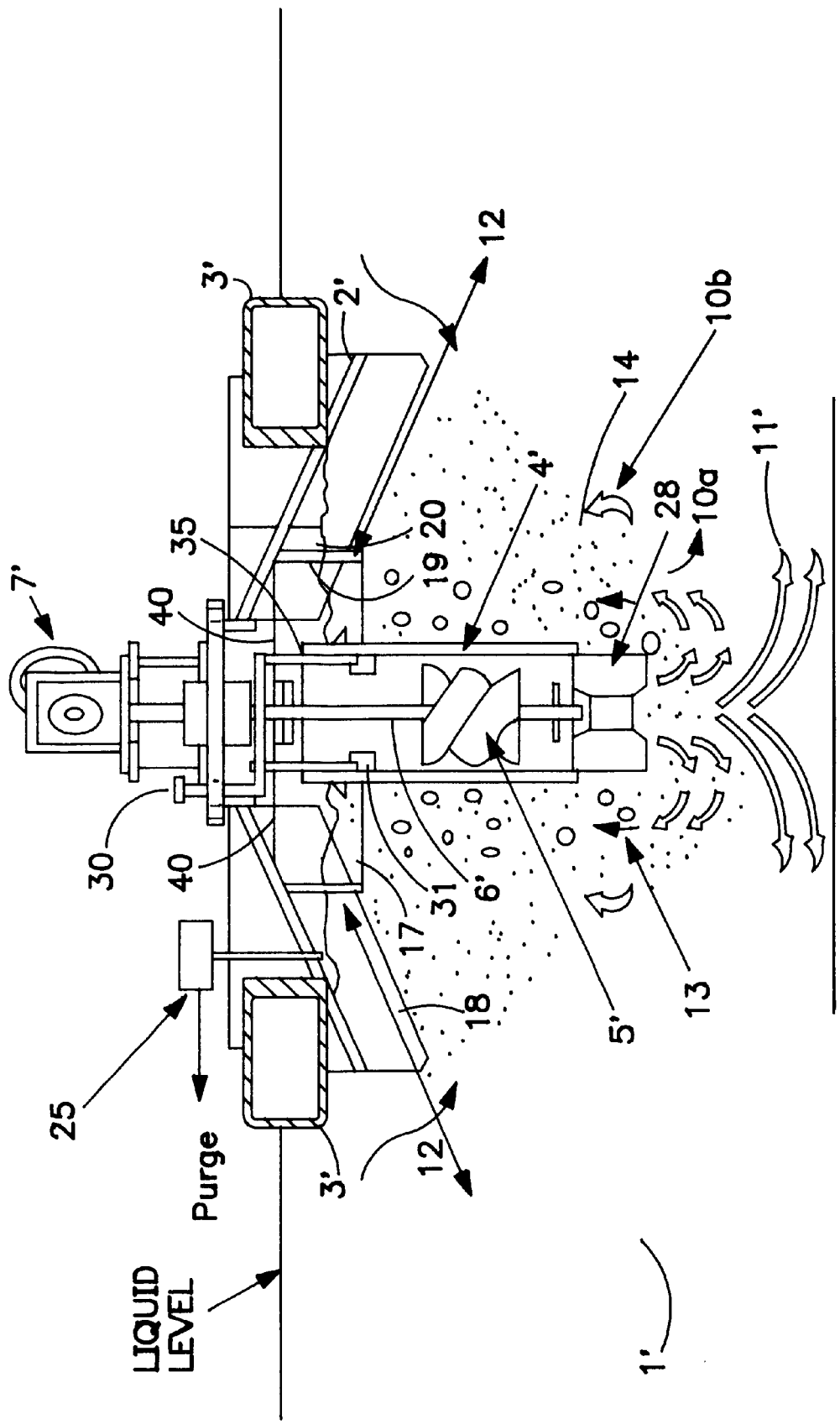
FIG. 4 is a schematic flow diagram of an embodiment of the invention for use with an oxygen containing gas having between 21–95 vol % oxygen.

While the embodiment described in FIG. 4 is useful for gases containing more than 21 vol. % oxygen, it is preferred to use oxygen having a purity of between about 90–95 vol. % oxygen. From an economic standpoint, this purity of oxygen is most preferred as it may be produced via on-site adsorption processes (e.g. PSA/VPSA/VSA). For the purposes of this disclosure, a low purity oxygen gas is one having an oxygen concentration greater than 21 vol. % and up to about 95 vol. % oxygen. Although air can be used, it is less preferred as the advantages of high concentration driving force and emissions will be diminished. As indicated above, however, the use of a low purity gas results in excessive nitrogen gas buildup in the headspace. This is because as the oxygen dissolves, the nitrogen concentration inside the undissolved gas bubbles increases. Further, in wastewater applications, the nitrogen in the bubbles will not dissolve into the wastewater because the wastewater is already saturated with nitrogen from the air due to its contact with the atmosphere. Therefore, each time undissolved (nitrogen containing) gas bubbles recirculate and return to the hood, the nitrogen concentration in the headspace increases. Consequently, the oxygen concentration inside the hood in the headspace (e.g. above the liquid level) will ultimately drop below that of the low purity oxygen feed gas. The performance of the system will be substantially hindered due to saturation of the headspace with nitrogen, because it will, at least partially, replace the oxygen recirculated into the wastewater.

In light of this, we have developed an embodiment of the present invention which may be utilized with gases having >21 vol. % to about 95 vol. % oxygen (preferably 90–95 vol. %), and which addresses the problems associated with excess nitrogen in the system. This embodiment includes three features and is illustrated in FIG. 4.

We should note that FIG. 4 uses reference numbers 1'–11' to indicate similar features in with the embodiment of FIG. 1. Note that in the FIG. 4 embodiment, the use of a floating hood is preferred over a baffle. The first feature is the use of one or more segregation rings 12 installed so that large gas bubbles 13 with high oxygen concentration are preferentially recycled. Relatively speaking, large gas bubbles can range from an average diameter of about 5 mm to about 50 mm while small bubbles can range from an average diameter of about 0.1 mm to less than about 5 mm. The fraction of large gas bubbles preferentially recycled will be dependent on the purity of the gases. The higher the purity of oxygen, the larger fraction of the gases will be treated as large gas bubbles for recycle and visa versa.

It was discovered as part of this invention that larger gas bubbles 13 have a higher buoyancy force than the small gas bubbles 14. When the two phase liquid exits from the draft tube 4' and (optional) baffle 28' of the downward pumping impeller 5', the two-phase mixture will expand outwards as illustrated by flow pattern 11'. The large bubbles (having a higher buoyancy force) 13 will break away from the liquid stream first and flow upwards in flow pattern 10a. The smaller gas bubbles (having a lower buoyancy force) 16 will remain with the liquid stream the longest. Consequently, the smaller gas bubbles 16 will travel more horizontally than the larger gas bubbles 13 in flow pattern 10b. Thus gas bubbles rising near the draft tube 4' are mostly larger bubbles while the gas bubbles collected at the outer edge of the hood 2' would have mostly smaller bubbles.

Because smaller bubbles have larger surface area to volume ratio than larger bubbles, the oxygen mass transfer is faster in the small bubbles than in the large bubbles. Consequently, the oxygen concentration of the large gas bubbles collected near the draft tube will be higher than the smaller bubbles collected under the outer edge of the baffle.

In order to capitalize on these phenomena, one or more concentric rings 12 may be installed under the hood 2' to segregate the gas being collected, as shown in FIG. 4. The gas collected in the inner section 17 will have higher oxygen concentration than the gas collected in the outer section 18. Because the surface vortex (not shown) occupies only a small area of the draft tube 4', only the higher purity gas from the inner section 17 of the segregation ring is ingested by the surface vortex.

In order to keep the system stable during operation, an opening 19 in the ring(s) 12 is necessary to permit communication between the inner and outer sections divided by the ring. The opening 19 allows the pressure in the two sections to be equalized when needed. Without the opening, excess gas pressure may build up in the outer section 18 at the baffle, resulting in a depressed liquid level or in floating the baffle out of position. A damper 20 may be used to adjust the size of the opening so that the gas intermixing and pressure equalization can be optimized. We should note that the system may operate with different liquid levels in each of regions 17 and 18.

The second feature is a back pressure regulator 25 installed in the hood covering the outer region 18 where the smaller gas bubbles collect. This allows the gas with lower oxygen content to be preferentially purged off while the liquid level inside the hood is maintained. Thus the oxygen supply is regulated based on actual dissolved oxygen concentration (e.g. oxygen demand) in the system. This is an improvement over systems wherein oxygen was supplied based solely upon the gas pressure inside the hood.

With all these modifications, the concentration of the nitrogen under the baffle will still rise since it has no where to go to. To maintain the oxygen concentration under the hood, gas from under the hood can be purged periodically or continuously. Thus, back pressure regulator 25 can be used to serve the dual purpose of maintaining the pressure inside the hood and purging off excess nitrogen.

When the nitrogen concentration increases, the oxygen mass transfer into the wastewater for biological consumption decreases. As the oxygen demand of the biomass in the wastewater remains the same, the dissolved oxygen concentration will decrease. In this embodiment, the dissolved oxygen is monitored so that the oxygen demand can be detected and call for more fresh oxygen to the system. When fresh low purity oxygen is added, the backpressure regulator 25 will open up to allow the lower purity oxygen (e.g. lower purity than the fresh oxygen containing gas being added via spargers 31, discussed below) from the outer edge of the hood to escape, in effect purging off the nitrogen. For maximum oxygen transfer rate, it is most desirable to inject the oxygen containing gas directly into the oxygen depleted liquid.

For the third feature fresh low purity oxygen is injected directly into the vortex formed by the rotating helical impeller 51 via line gas line 30 and spargers 31. This allows the fresh oxygen to be preferentially dispersed into bubbles below the inside liquid surface (The inside liquid level is illustrated by line 40) without mixing with lower purity gas being recycled to the hood as undissolved bubbles.

Further, it was found from that it is necessary to inject the low purity oxygen directly into the surface vortex regime of the rotating impeller such that the oxygen has no chance to flow upwards prior to being forced downward by the downward pumping impeller. The reason is that the buoyancy force of the injected gas is so great that, unless the gas is injected into the vortex, little would be dissolved or drawn down by the impeller 5'. Rather, undissolved gas bubbles would return to the surface and mix with the gas inside the hood.

It was also found that single surface vortex formed by a rotating downward pumping impeller can only create very large gas bubbles and gas flooding of the impeller. Gas flooding occurs when gas collects around the shaft of the impeller, destroying the pumping capability of the impeller. In order to address this problem, vertical baffles 35 are installed to break the surface rotation, producing multiple surface vortices. Thus, when two vertical baffles are used, two separate surface vortices are formed. The number of vertical baffles 35 increases with the size of the impeller.

The vertical baffles 35 minimize the problem associated with gas flooding on the shaft and single surface vortex. However, they create a problem in how to properly introduce the low purity oxygen into the surface vortex zone. This is because the use of a single injection tube creates an extremely unstable situation as gas would only be entrained into a single surface vortex, resulting in damaging vibrations and unsteady operation.

The present invention uses multiple injectors or spargers 31, one for each surface vortex so that the gas entrainment can be balanced. These allow the fresh low-purity oxygen to be drawn down into each vortex and be dispersed rapidly before being mixed with the recirculating gas from the hood. As long as individual gas bubbles are formed during injection, the chance of immediate coalescence, mixing and gas hugging of the impeller can be minimized. It should be noted that as alternatives to single sparger injectors, ring spargers, preferably sintered metal ring spargers, may be used so long as gas entrainment remains balanced in the vortices.

The invention can also be used to dissolve other gases, such as carbon dioxide and hydrogen, if so desired for particular water treatment purposes, or for the treatment of other liquids, e.g., organic liquids.

In addition to the biotreatment purposes referred to above, the in-situ oxygenator of the invention may be used to supply oxygen for municipal and industrial waste water treatment, fish farming and other applications involving a large body of water or other liquid.

It will be appreciated that various other changes and modifications can be made in the details of the invention without departing from the scope of the invention as recited in the appended claims. Thus, the floating hood or baffle means employed is preferably a somewhat conical-shaped-horizontal floating hood or baffle of sufficient width or size to capture most of the undissolved gas, but a variety of other hood or baffle types and shapes may be positioned above or preferably below the outer surface of the liquid so long as they are adapted to capture and funnel most of the undissolved oxygen or other injected gas into the draft tube section of the gas dissolution system of the invention. For example, a plastic bubble or a flexible balloon canopy can be inflated by the use of a convenient injection device that can add as much gas as desired to the headspace under the canopy. Furthermore, the impeller means are desirably helical, axial flow, down pumping impeller means adapted to facilitate the downward flow of a gas-liquid mixture in the draft tube, but any suitable down-flowing impellers, such as a Lightnin A315® or Aire-$O_2$ Turbo®-mixer can be employed to create the desired downward flow in the draft tube. It will be understood that the impeller means may also include additional features, such as a radial and/or axial flow impeller means connected to the drive shaft to create a high shear zone in the draft tube to further enhance the dissolution of gas in the liquid.

The invention has been described above and illustrated with reference to a hollow draft tube, e.g. hollow draft tube 4 of FIG. 1, as in the AGR and LOR approaches referred to herein. It should be noted that it is within the scope of the invention to employ embodiments thereof in which the hollow draft tube is not employed. In such embodiments, the downward pumping impeller means is nevertheless positioned, with respect to the floating hood or baffle means, so that the hood or baffle means capture most of any undissolved gas that floats to the surface of the liquid following its downward passage, together with liquid rich in dissolved gas, under the downward pumping influence of the impeller means. The use of a draft tube is nevertheless desirable for many applications in enabling power to be efficiently utilized, so that it is not necessary to pump as much liquid as otherwise required, and in precluding undue mixing of solids with the portion of the body of liquid being treated. It will be understood that, in the practice of the various embodiments of the invention, additional baffle means can be provided in the overall system to facilitate the flow of gas and liquid as herein disclosed for the desired gas dissolution purposes of the invention.

From the description and examples above, it will be appreciated that the invention represents a desirable advance in the gas dissolution art as it pertains to the treatment of large bodies of liquid. The invention is particularly advantageous in the safe and efficient dissolution of oxygen in large bodies of liquids in industries such as biotreatment and wastewater treatment. By enabling such treatments to be carried out in-situ and at relatively low pumping power requirements, the invention enhances the technical and economic feasibility of gas dissolution operations in a variety of practical and important industrial processing operations.

What is claimed is:

1. A system for the dissolution of gas in a large body of liquid comprising:
    (a) an impeller positioned below the surface of the large body of liquid and adapted to cause the passage of a gas-liquid mixture downwardly in said large body of liquid;
    (b) a floating hood positioned over said impeller and of sufficient size to capture most of the undissolved gas that separates from a liquid rich in dissolved gas and floats and to the surface of said large body of liquid for recirculation to said impeller; and
    (c) a conduit for introducing a feed gas stream beneath said floating hood and directly into said large body of liquid, so that bubbles of the gas are caused by the suction of said impeller to pass with liquid, as a gas-liquid mixture, downward in said large body of liquid,
    (d) at least one segregation ring positioned under said floating hood and extending below the surface of said large body of liquid such that a first inner region between said ring and said impeller, and a second outer region between said ring and an outer diameter of said floating hood are created, and wherein said bubbles of said gas are segregated by their relative size, such that larger bubbles containing comparatively high purity oxygen are collected in said inner region and smaller bubbles containing comparatively low purity oxygen are collected in said outer region;
    (e) a back pressure regulator located in said floating hood adjacent to said outer diameter of said floating hood, for purging said comparatively low purity oxygen gas;
    whereby the liquid rich in dissolved gas, because of the absence of container vessel walls, is dispersed into the large body of liquid, while undissolved gas, due to its buoyancy, floats to the surface of said large body of liquid and is captured for recirculation, resulting in essentially complete utilization of the feed gas stream.

2. The system of claim 1 in which said floating hood means is positioned partially below the surface of said large body of liquid.

3. The system of claim 2 and including means to float or support said floating hood means.

4. The system of claim 1 in which said floating hood means comprise a flexible balloon canopy.

5. The system of claim 1 in which said floating hood means comprise a plastic bubble.

6. The system of claim 1 in which said impeller means comprises an axial flow, down-pumping impeller.

7. The system of claim 1 and including a hollow draft tube submerged below the surface of said large body of liquid, said hollow draft tube having open ends at the top and bottom thereof, but without a container vessel for the liquid in the vicinity of the hollow draft tube, said impeller means being positioned within the hollow draft tube so that the gas-liquid mixture is caused to pass downward in said hollow draft tube for discharge from the bottom thereof.

8. The system of claim 7 in which said floating hood means is positioned partially below the surface of said large body of liquid.

9. The system of claim 8 and including means to float or support said floating hood means.

10. The system of claim 7 in which said floating hood means comprise a flexible balloon canopy.

11. The system of claim 7 in which said floating hood means comprise a plastic bubble.

12. The system of claim 7 in which said impeller means comprises an axial flow, down-pumping impeller.

13. The system of claim 8 in which said conduit means introduce the feed gas stream directly into a vortex created by said impeller when said impeller rotates.

14. The system of claim 7 in which said floating hood means comprise a generally conical shaped, horizontal hood.

15. The system of claim 14 in which said floating hood means is positioned partially below the surface of said large body of liquid.

16. The system of claim 15 and including means to float or support said floating hood means.

17. The system of claim 16 in which said impeller means comprises an axial or radial flow, down-pumping impeller.

* * * * *